US008360838B2

(12) United States Patent
Nguyen et al.

(10) Patent No.: US 8,360,838 B2
(45) Date of Patent: Jan. 29, 2013

(54) DETECTING AND PREVENTING BOTS AND CHEATING IN ONLINE GAMING

(75) Inventors: Binh Nguyen, Reno, NV (US); Bryan D. Wolf, Reno, NV (US); Brian Underdahl, VC Highlands, NV (US)

(73) Assignee: IGT, Reno, NV (US)

( * ) Notice: Subject to any disclaimer, the term of this patent is extended or adjusted under 35 U.S.C. 154(b) by 1594 days.

(21) Appl. No.: 11/480,713

(22) Filed: Jul. 3, 2006

(65) Prior Publication Data

US 2008/0004107 A1    Jan. 3, 2008

(51) Int. Cl.
*A63F 9/24* (2006.01)
*A63F 13/00* (2006.01)
*G06F 17/00* (2006.01)
*G06F 19/00* (2011.01)

(52) U.S. Cl. .................... 463/9; 463/29; 463/42
(58) Field of Classification Search .................. 463/9, 42
See application file for complete search history.

(56) References Cited

U.S. PATENT DOCUMENTS

| | | | |
|---|---|---|---|
| 3,931,504 A | 1/1976 | Jacoby | |
| 4,430,728 A | 2/1984 | Beitel et al. | |
| 4,454,594 A | 6/1984 | Heffron et al. | |
| 4,582,324 A | 4/1986 | Koza et al. | |
| 5,643,086 A | 7/1997 | Alcorn et al. | |
| 5,655,961 A | 8/1997 | Acres et al. | |
| 5,761,647 A | 6/1998 | Boushy | |
| 5,766,076 A | 6/1998 | Pease et al. | |
| 5,851,149 A | 12/1998 | Xidos et al. | |
| 5,871,400 A | 2/1999 | Yfantis | |
| 6,047,324 A | 4/2000 | Ford | |
| 6,099,408 A | 8/2000 | Schneier et al. | |
| 6,104,815 A | 8/2000 | Alcorn et al. | |
| 6,106,396 A | 8/2000 | Alcorn et al. | |
| 6,113,492 A | 9/2000 | Walker et al. | |
| 6,113,495 A | 9/2000 | Walker et al. | |
| 6,149,522 A | 11/2000 | Alcorn et al. | |
| 6,190,256 B1 | 2/2001 | Walker et al. | |
| 6,253,374 B1 | 6/2001 | Dresevic et al. | |

(Continued)

FOREIGN PATENT DOCUMENTS

| AU | 199650576 | 4/1997 |
|---|---|---|
| AU | 2004212348 | 8/2003 |

(Continued)

OTHER PUBLICATIONS

International Search Report and Written Opinion dated Feb. 26, 2008 issued in Application No. PCT/US2007/014952.

(Continued)

*Primary Examiner* — Michael Cuff
*Assistant Examiner* — Kevin Y Kim
(74) *Attorney, Agent, or Firm* — Weaver Austin Villeneuve & Sampson LLP

(57) ABSTRACT

Methods and devices are provided for detecting and/or preventing cheating in online gaming. Some implementations provide gaming information in formats that are difficult for a bot to interpret, but which are preferably easy for humans to interpret. Some implementations of the invention involve the tracking and analysis of players' gaming activities. Some implementations of the invention provide a multi-tier approach to data analysis. Some analyses may be performed, for example, by a centralized computing device such as a server, whereas other analyses may be performed by a host device. In some implementations, "challenge and response" measures will be employed. Some implementations of the invention involve detection and prevention of collaboration between players.

25 Claims, 8 Drawing Sheets

U.S. PATENT DOCUMENTS

| | | |
|---|---|---|
| 6,280,328 B1 | 8/2001 | Holch et al. |
| 6,310,873 B1 | 10/2001 | Rainis et al. |
| 6,343,990 B1 | 2/2002 | Rasmussen et al. |
| 6,446,257 B1 | 9/2002 | Pradhan et al. |
| 6,449,687 B1 | 9/2002 | Moriya |
| 6,453,319 B1 | 9/2002 | Mattis et al. |
| 6,454,648 B1 | 9/2002 | Kelly et al. |
| 6,575,829 B2 | 6/2003 | Coleman et al. |
| 6,645,078 B1 | 11/2003 | Mattice |
| 6,666,765 B2 | 12/2003 | Vancura |
| 6,739,973 B1 | 5/2004 | Lucchesi et al. |
| 6,749,502 B2 | 6/2004 | Baerlocher |
| 6,853,973 B2 | 2/2005 | Mathews et al. |
| 6,866,586 B2 | 3/2005 | Oberberger et al. |
| 6,896,618 B2 | 5/2005 | Benoy et al. |
| 6,962,530 B2 | 11/2005 | Jackson |
| 6,997,803 B2 | 2/2006 | LeMay et al. |
| 7,801,303 B2 | 9/2010 | Dulac |
| 7,988,559 B2 | 8/2011 | Yoseloff et al. |
| 8,057,298 B2 | 11/2011 | Nguyen et al. |
| 2001/0031663 A1 | 10/2001 | Johnson |
| 2001/0039210 A1 | 11/2001 | St-Denis |
| 2001/0044339 A1 | 11/2001 | Cordero et al. |
| 2002/0002075 A1 | 1/2002 | Rowe |
| 2002/0016202 A1 | 2/2002 | Fertitta et al. |
| 2002/0022516 A1 | 2/2002 | Forden |
| 2002/0028706 A1 | 3/2002 | Barnard et al. |
| 2002/0082076 A1* | 6/2002 | Roser et al. .............. 463/25 |
| 2002/0093136 A1 | 7/2002 | Moody |
| 2002/0111205 A1 | 8/2002 | Beavers |
| 2003/0054878 A1 | 3/2003 | Benoy et al. |
| 2003/0069074 A1 | 4/2003 | Jackson |
| 2003/0157979 A1 | 8/2003 | Cannon et al. |
| 2004/0242321 A1* | 12/2004 | Overton .................. 463/29 |
| 2005/0043086 A1* | 2/2005 | Schneider ............... 463/25 |
| 2005/0065802 A1 | 3/2005 | Rui et al. |
| 2005/0137016 A1 | 6/2005 | Enzminger et al. |
| 2005/0272501 A1* | 12/2005 | Tran et al. .............. 463/29 |
| 2005/0288080 A1 | 12/2005 | Lockton et al. |
| 2006/0019749 A1 | 1/2006 | Merati et al. |
| 2006/0068871 A1 | 3/2006 | Crawford, III et al. |
| 2006/0281541 A1 | 12/2006 | Nguyen et al. |
| 2007/0238528 A1* | 10/2007 | Harris et al. ............ 463/42 |
| 2007/0270213 A1 | 11/2007 | Nguyen et al. |
| 2011/0281655 A1 | 11/2011 | Nguyen et al. |

FOREIGN PATENT DOCUMENTS

| | | |
|---|---|---|
| EP | 0 769 769 | 4/1997 |
| EP | 1 255 234 | 11/2002 |
| GB | 2 392 276 | 2/2004 |
| JP | 10-277243 | 10/1998 |
| WO | WO 02/073501 | 9/2002 |
| WO | WO 2004/021290 | 3/2004 |
| WO | WO 2004/071601 | 8/2004 |
| WO | WO 2008/005264 | 1/2008 |
| WO | WO 2008/016610 | 2/2008 |

OTHER PUBLICATIONS

Anonymous: "Noble Poker: Security & Integrity", Internet Article, [Online] May 12, 2005, XP002465543 Retrieved from the Internet: http://web.archive.org/web/20050512081751/http://www.moblepoker.com/.

Philippe Golle et al., "Preventing Bots from Playing Online Games" ACM Computers in Entertainment, [Online] vol. 3, No. 3, Jul. 2005, pp. 1-10, XP002465544 Retrieved from the Internet: http://portal.acm.org/citation.cfm?doid=1077246.1077255.

J. Adamec, "Checkraise: The Bots", Blogcritics.org News, downloaded from http://blogcritics.org/archives/2005/09/09/093200.php on Jun. 30, 2006, 3 pages.

U.S. Appl. No. 09/642,192, filed Aug. 18, 2000, LeMay et al.

U.S. Office Action dated Mar. 8, 2010 issued in U.S. Appl. No. 11/497,740.

U.S. Office Action Final dated Aug. 12, 2010 issued in U.S. Appl. No. 11/497,740.

U.S. Office Action dated Jul. 22, 2011 issued in U.S. Appl. No. 11/497,740.

U.S. Final Office Action dated Dec. 12, 2011 issued in U.S. Appl. No. 11/497,740.

U.S. Office Action dated Jan. 7, 2010 issued in U.S. Appl. No. 11/881,190.

U.S. Final Office Action dated Jun. 11, 2010 issued in U.S. Appl. No. 11/881,190.

U.S. Office Action dated Nov. 24, 2010 issued in U.S. Appl. No. 11/881,190.

U.S. Notice of Allowance dated Jun. 23, 2011 issued in U.S. Appl. No. 11/881,190.

U.S. Notice of Allowance dated Sep. 9, 2011 issued in U.S. Appl. No. 11/881,190.

U.S. Office Action dated Jan. 11, 2012 issued in U.S. Appl. No. 13/188,281.

Third Party Submission dated Jan. 17, 2012 for U.S. Appl. No. 13/188,281.

U.S. Notice of Allowance dated Apr. 25, 2012 issued in U.S. Appl. No. 13/188,281.

U.S. Allowed Claims dated Apr. 25, 2012 for U.S. Appl. No. 13/188,281.

PCT Partial International Search Report dated Jan. 25, 2008 issued in PCT/US2007/017121.

PCT International Search Report dated Apr. 7, 2008 issued in PCT/US2007/017121 (WO2008/016610).

PCT Written Opinion dated Apr. 7, 2008 issued in PCT/US2007/017121 (WO2008/016610).

PCT International Preliminary Report on Patentability and Written Opinion dated Feb. 3, 2009 issued in PCT/US2007/017121 (WO2008/016610).

Australian Examiner's first report dated Jul. 28, 2011 issued in 2007281499.

Australian Examiner's report No. 2 dated Jan. 5, 2012 issued in 2007281499.

Australian Examiner's report No. 3 dated Mar. 27, 2012 issued in 2007281499.

Chinese Office Action dated Jul. 31, 2009 issued in CN200780036010.9.

Chinese First Office Action dated Nov. 25, 2010 issued in CN200780036010.9.

Chinese Second Office Action dated Jun. 16, 2011 issued in CN200780036010.9.

Chinese Third Office Action dated Oct. 26, 2011 issued in CN200780036010.9.

International Preliminary Report on Patentability and Written Opinion dated Jan. 6, 2009 issued in PCT/US2007/014952.

CS Guard, (Dec. 19, 2001) Half-Life www.olo.counter.com, webpage retrieved from the Internet at http://www.olo.counter-strike.pl/index.php?page=archive on Jun. 3, 2010, 5 pages.

\* cited by examiner

DETECTING AND PREVENTING BOTS AND CHEATING IN ONLINE GAMING

FIELD OF THE INVENTION

The present disclosure relates to gaming devices, methods and networks. In particular, the invention relates to wagering games conducted via the Internet, which will sometimes be referred to herein as "online gaming" or the like. However, as described below, the invention is not limited to wagering games.

BACKGROUND OF THE INVENTION

Although Internet wagering games are currently illegal in the United States, they are very popular in many parts of the world. A recent poll of United States citizens determined that approximately 67% believed that the United States government should allow entities based in the United States to legally provide Internet wagering games.

One barrier to the further acceptance of online gaming by the United States government (and other governments) is the perception that online gaming very often involves cheating. Such cheating may take various forms. For example, some players are known to use so-called "bots" (or similar software) for Internet wagering games. These bots can apply perfect or nearly perfect strategies during game play. Other types of cheating involve unfair collaboration between players.

In some instances, the foregoing techniques have been combined to produce an even greater advantage. Moreover, some online players use multiple devices for cheating. For example, a player may use a first personal computer ("PC") for participation in online gaming via, e.g., a gaming application and a restricted user account. A bot and remote control software may be running on a second PC, whereby the games played on the first PC are being controlled by the bot on the second PC. In this way, a human will appear to be participating in the online gaming sessions and could even interact with other players or provide other human responses that would be difficult to automate.

It will probably be illegal to provide Internet wagering games in the United States and other jurisdictions until it can be proven to gaming regulators that the games can be provided in a fair and honest fashion. Accordingly, it would be very desirable to develop new methods for detecting and preventing cheating in wagering games conducted via the Internet.

SUMMARY OF THE INVENTION

Methods and devices are provided for detecting and/or preventing cheating in online gaming. Some implementations provide gaming information in formats that are difficult for a bot to interpret, but which are preferably easy for humans to interpret. Some implementations of the invention involve the tracking and analysis of players' gaming activities.

Some implementations of the invention provide a multi-variable and/or a multi-tier approach to data analysis. A centralized computing device such as a server may perform some analyses, for example, whereas a host device may perform other analyses. In some implementations, "challenge and response" measures will be employed. Some implementations of the invention involve detection and prevention of collaboration between players.

Some implementations of the invention provide a gaming method that includes these steps: gathering gaming data on a host device while online gaming software is executing on the host device; evaluating a first component of the gaming data to detect first indicia of cheating, the first component of the gaming data comprising financial data; and invoking cheating countermeasures when first indicia of cheating are detected. The first indicia of cheating may, for example, comprise win frequency indicia or win amount indicia. In some such implementations, a central computing device performs the evaluating step, at least in part. However, this need not be the case; other devices, including but not limited to host devices or other local devices, may perform at least part of such evaluations.

The cheating countermeasures may comprise evaluating a second component of the gaming data for second indicia of cheating. For example, the cheating countermeasures comprise causing a central device to query a selected host device for second indicia of cheating. The second indicia of cheating may indicate the use of a bot to control, at least in part, game play decisions. The second indicia of cheating may comprise at least one of play consistency indicia, reaction time indicia or optimal play indicia.

Alternative gaming methods are provided herein. One such method includes these steps: gathering gaming data on a first plurality of host devices while online gaming software is executing on the plurality of host devices; evaluating a first component of the gaming data on a central computing device to detect first indicia of cheating, the first component of the gaming data comprising financial data; analyzing a second component of the gaming data gathered by at least one of the first plurality of host devices to detect second indicia of cheating; and invoking cheating countermeasures when first indicia of cheating or second indicia of cheating are detected.

The analyzing step may, for example, be performed by a host device in response to a signal from the central computing device. The signal may be sent by the central computing device in response to detecting first indicia of cheating. The second indicia of cheating may be play consistency indicia, reaction time indicia, collusion indicia and/or optimal play indicia. When a bot is detected according to at least one of the first indicia of cheating or the second indicia of cheating, the cheating countermeasures may involve preventing the bot from participating in games involving human participants.

The gaming method may include the step of transmitting a signal from the central computing device to a second plurality of host devices in response to detecting first indicia of cheating. The analyzing step may involve evaluating collusion indicia and may be performed, at least in part, by the central computing device based on information received from the second plurality of host devices. The information may, for example, comprise results of an analysis performed by the second plurality of host devices. Accordingly, the analyzing step may be performed, at least in part, by the second plurality of host devices.

The analyzing step may involve collusion detection. For example, the analyzing step may involve determining lapse times during which a player's game play is worse than the player's normal level of game play and/or determining whether one or more other players consistently win during a player's lapse times.

Other gaming methods of the invention involve the steps of providing an online wagering game involving a plurality of host devices and at least one game server, and presenting game data required for participation in the online wagering game in a format that requires a human interface or the use of pattern recognition methods.

For example, the game data may comprise playing card data and the format presentation may comprise varying an angle of rotation for a playing card, varying positions of playing card symbols on the playing cards, a variable display of playing card hands. The variable display may comprise providing playing card hands as a single image of fanned-out playing cards. Alternatively, or additionally, the format presentation may comprise playing card images displayed as playing card backs, wherein playing card symbols are temporarily shown only at turned up corners of the playing card images.

The format presentation may comprise an entire screen of game play information, including player input areas, displayed as one image. For example, the player input areas may comprise buttons that are displayed in different areas of the image at different times.

Some game data required for participation in the online wagering game may be provided in the format of voice commands. The voice commands may be provided as voices having a variety of regional accents. Wagering data for participation in the online wagering game may be provided as images of wager tokens, such as images of poker chips.

Still other gaming methods are provided herein. One such method includes these steps: gathering game play data while players are using a plurality of host devices to play Internet wagering games; analyzing the game play data to determine individual players' typical gaming styles and times of deviation from the typical gaming styles; and comparing times of deviation from players' typical gaming styles to determine instances of probable collusion between players. The method may also include the following steps: determining locations of at least some of the plurality of host devices; and determining whether at least some of the instances of probable collusion involve multiple host devices at one location.

The present invention provides hardware that is configured to perform the methods of the invention, as well as software and/or firmware to control devices to perform these and other methods. These and other features of the present invention will be presented in more detail in the following detailed description of the invention and the associated figures.

DETAILED DESCRIPTION OF THE INVENTION

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

The present invention provides novel methods and devices to detect and/or prevent cheating in online gaming, including but not limited to gaming that involves wagering games. Moreover, although many exemplary methods will be described in the context of online poker games, some aspects of the present invention are not so limited, but instead apply generally to games conducted via the Internet.

Figure 1:
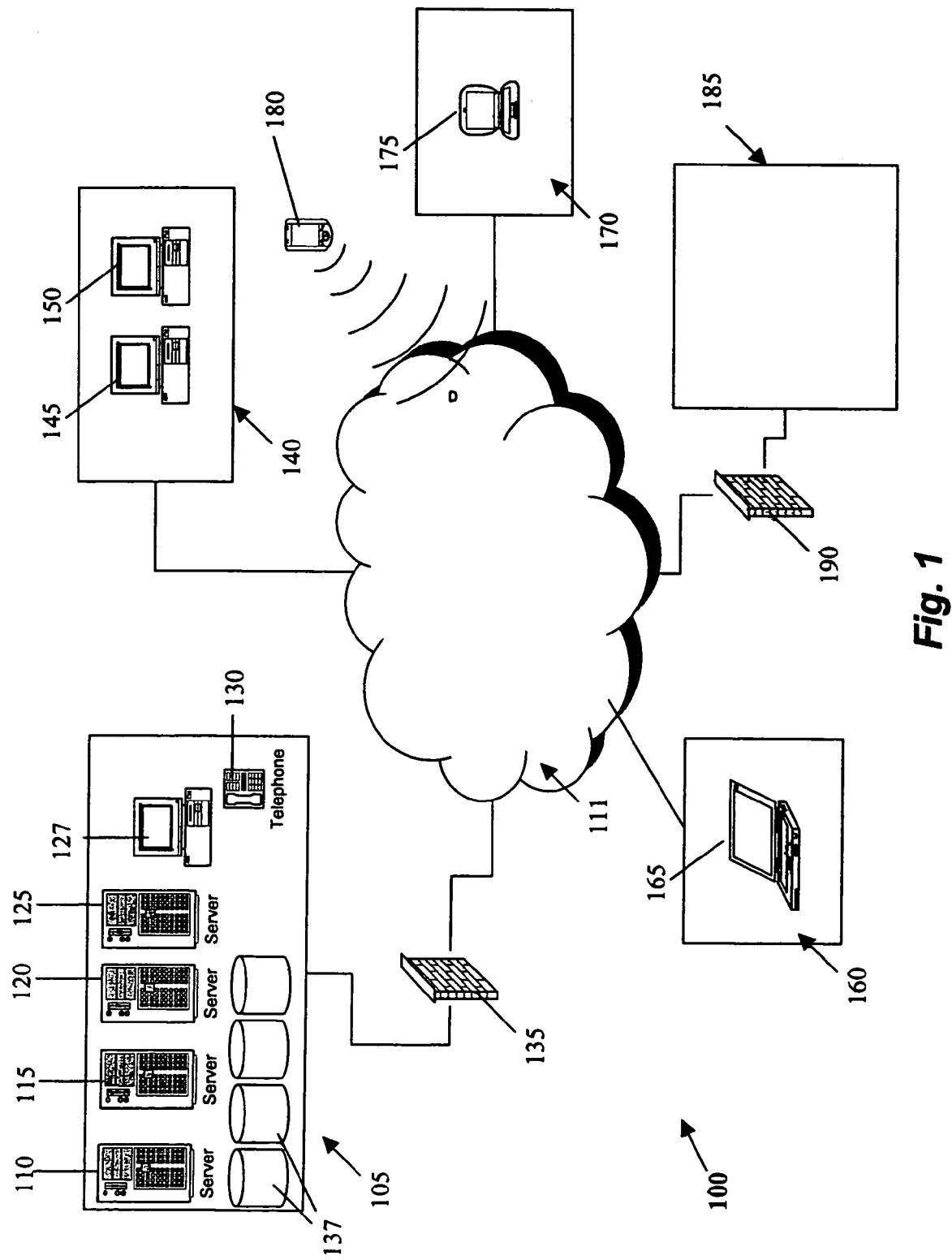
FIG. 1 illustrates a network that may be used to implement some aspects of the invention.

A simplified depiction of one such network is shown in FIG. 1. It will be appreciated that other types of networks involving different devices, more or fewer devices, etc., may be used to implement the present invention. For example, game provider 105 provides Internet wagering games, but is not a gaming establishment (such as a casino or the like) that provides on-site wagering games. However, in alternative implementations, game provider 105 may be associated with such a gaming establishment.

In this example, game provider 105 provides Internet wagering games via one or more of servers 110, 115, 120 and 125. In some implementations, servers 110, 115, 120 and 125 may be configured for specialized tasks. For example, server 110 may be primarily configured to provide games, server 115 may be primarily configured to provide authentication/identification functions, server 120 may be primarily configured to provide cheating detection services and related countermeasures, and server 125 may be primarily configured to provide accounting and financial services.

However, tasks may be apportioned among devices in any convenient fashion. For instance, host device 125 may allow an operator to monitor the activities of game provider 105 and of gaming participants, but may also be involved in some aspects of data analysis/cheating detection. As described in more detail below, players' host devices may also be involved in some aspects of data gathering and analysis.

Telephone 130 allows direct verbal communication between personnel of game provider 105 and others, including gaming participants. Storage devices 137 allow storage of data, including but not limited to accounting and financial data, game play data, player data, analyses, etc. In some implementations of the invention, storage is provided at another location, e.g., via a storage network. Such storage may, for example, provide data mirroring or other types of redundancy. Preferably, redundant blades, servers and/or other devices provide failover protection.

Firewall 135 is interposed between the devices of game provider 105 and Internet 111. Game provider 105 provides wagering games to players in locations 140, 160 and 170, and to wireless device 180, via Internet 111. In this example, location 140 includes PC 145 and PC 150, location 160 includes laptop 165 and location 170 includes iBook™ 175. Wireless device 180 is a personal digital assistant in this example.

Financial institution 185 is also connected to Internet 111, via firewall 190. Financial institution 185 may be a bank, a credit union, a credit card company, or another such institution. Part of the online gaming process may involve the transfer of funds to and/or from network devices of financial institution 185. For example, game provider 105 may also provide account reconciliation services, periodic reports or gaming wins and losses, etc., in connection with financial institution 185.

It will be appreciated that games could be played via devices other than those illustrated in FIG. 1 and that other devices not shown in FIG. 1 may be used within the scope of the invention. For example, some methods and devices described in U.S. patent application Ser. No. 10/981,435, entitled "LOCATION AND USER IDENTIFICATION FOR ONLINE GAMING" and filed on Nov. 3, 2004, which is hereby incorporated by reference, may advantageously be used in connection with the present invention. Such devices include, but are not limited to, location detection devices and biometric devices (such as retinal scanners, hand and/or fingerprint scanners, voice recognition devices and the like).

Moreover, it will be appreciated that one or more networks other than Internet 111 may be used to implement various aspects of the invention, such as a satellite network, a wireless network, a metro optical transport, the PSTN, etc. Accordingly, a variety of protocols may be used for communication, such as Internet Protocol ("IP"), Fibre Channel ("FC"), FC over IP ("FCIP"), Internet SCSI ("iSCSI," an IP-based standard for linking data storage devices over a network and transferring data by carrying SCSI commands over IP networks), Dense Wavelength Division Multiplexing ("DWDM," an optical technology used to increase bandwidth over existing fiber optic backbones), or Code Division Multiple Access (CDMA, a wireless cellular communication technology).

Existing online gaming applications generally seek to convey as little information as possible, for the sakes of speed and efficiency. Before play begins, game software will have been downloaded and card images will have typically been cached on a player's PC for quick reference. Any reference to that symbol and card image (e.g., a command instructing a display device to "show the 2 of Hearts image") is an indication to a bot that "I have a 2 of Hearts." A human player generally does not know that he or she has a 2 of Hearts until an image of the card is presented on the screen.

Some aspects of the present invention provide methods and devices for preventing cheating in online gaming, or at least for making cheating more difficult and less prevalent. For example, some implementations of the present invention provide gaming information in formats that are difficult for a bot to interpret, but which preferably are easy for humans to interpret.

In order to make the use of bots more difficult, some implementations of the invention present playing card and/or hand images in a manner that is difficult for bots to interpret. Instead of using commands that reference playing card images, a new card or hand image may be downloaded when cards are "dealt."

Figures 2A, 2B, 2C:
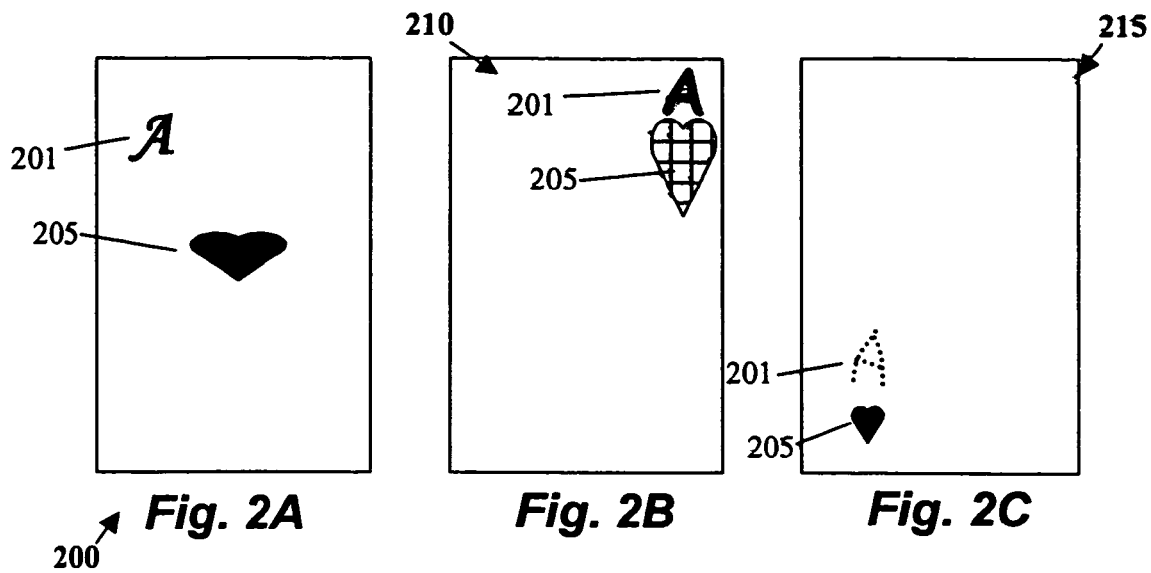
FIGS. 2A through 2F illustrate displays that may be used to implement some aspects of the invention.

Some exemplary playing card images are illustrated in FIGS. 2A through 2F. FIGS. 2A through 2C provide examples of card images 200, 210 and 215 wherein card symbol 201 and suit symbol 205 are presented in different formats and positions. In each case, the card image indicates an Ace of Hearts in a format that a person would readily understand, but which may be challenging for a bot to interpret, even if pattern-recognition software were used.

Here, card symbol 201 of FIG. 2A has a different font from that of card symbol 201 indicated in FIG. 2B and is in a different portion of the card. The stippled, hand-drawn outline of an "A" shown in FIG. 2C is merely one example of how letters and numbers may be distorted in ways that are difficult for pattern recognition software to interpret properly.

In FIGS. 2A through 2C, suit symbol 205 has a different size and a different aspect ratio. FIG. 2B illustrates how positioning card symbol 201 near suit symbol 205 can convey information that will be easily understood by a person, but could be difficult for pattern recognition software to sort out. In this example, the overall shape of card symbol 201 and suit symbol 205 could be interpreted as, e.g., a diamond shape. This effect is enhanced in FIG. 2B because suit symbol 205 is not solidly filled.

Figures 2D, 2E:
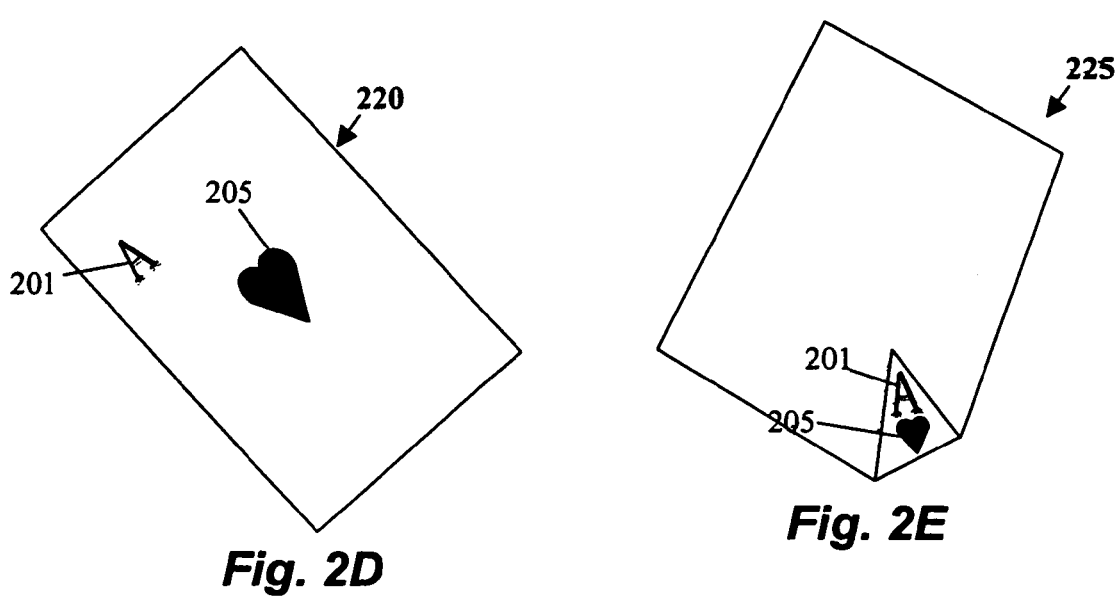

In some implementations of the invention, the entire playing card (or hand of playing cards) may be displayed as if it were rotated and/or distorted in some fashion. As illustrated in FIG. 2D, card images 220 can be displayed as rotated playing cards. Some implementations of the invention create a display of a card dealer who appears to flip cards toward the players, but they land a little bit skewed. The cards may be rotated as shown in card image 220 of FIG. 2D, or they may appear to land in other orientations. The card images may be perfectly or imperfectly aligned.

The apparent playing card orientations may change, e.g., randomly. In some implementations, the apparent playing card orientations change within a predetermined range that is deemed to be tolerable to human players (e.g., rotated up to 45 degrees from the vertical). Preferably, the angle of rotation is enough to be challenging for an image recognition program; accordingly, some such implementations have a minimum angle of skew (e.g., at least 15 degrees).

FIG. 2E illustrates card image 225 wherein a card corner is briefly "flipped up" to reveal card symbol 201 and suit symbol 205. Such methods will be more readily integrated into particular games. For example, Texas Holdem involves an action of turning up a corner of a card, in order to identify the card. Nonetheless, these methods could be used in other card games that do not traditionally involve flipping up a card corner quickly, in order to provide another method for presenting playing cards in a manner that is difficult for a bot to recognize.

Figure 2F:
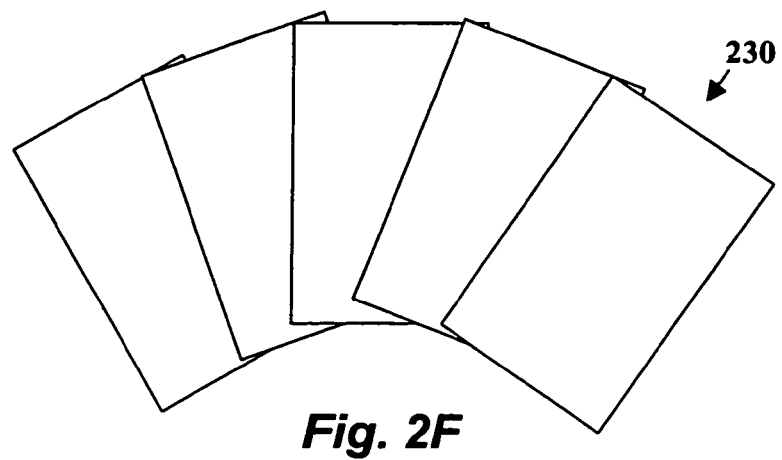

In some implementations, an entire hand of cards is downloaded as one image, e.g., as shown in FIG. 2F. Here, hand display 230 depicts a hand of playing cards that are fanned out as a player might hold a hand of cards. The spacing and angle of rotation can be varied. The position and type of display for card symbol 201 and suit symbol 205 may be varied, as described above. Images of individual cards may be displayed at some times and images of card hands may be displayed in other times.

Figure 3A:
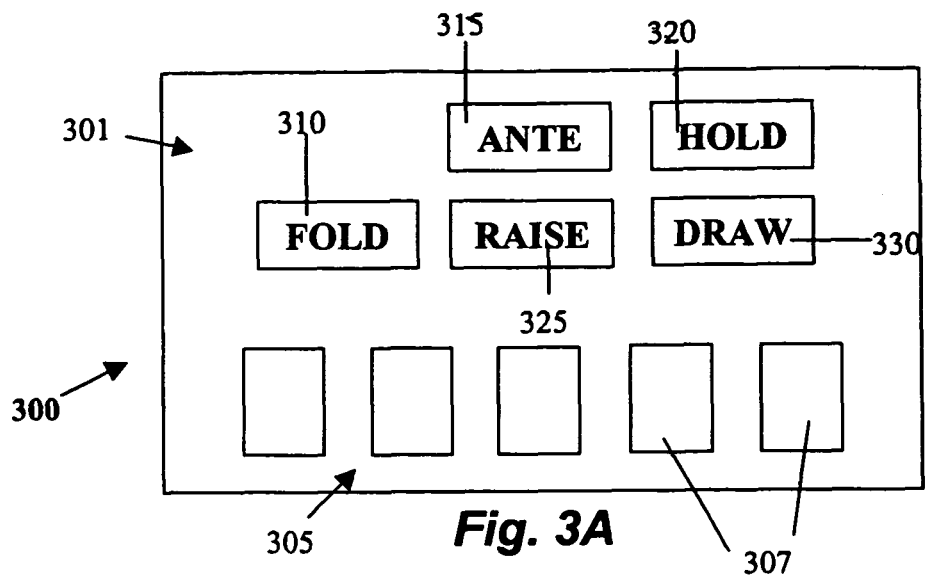
FIGS. 3A-3C illustrate graphical user interfaces ("GUIs") that may be used to implement some aspects of the invention.
Figure 3B:
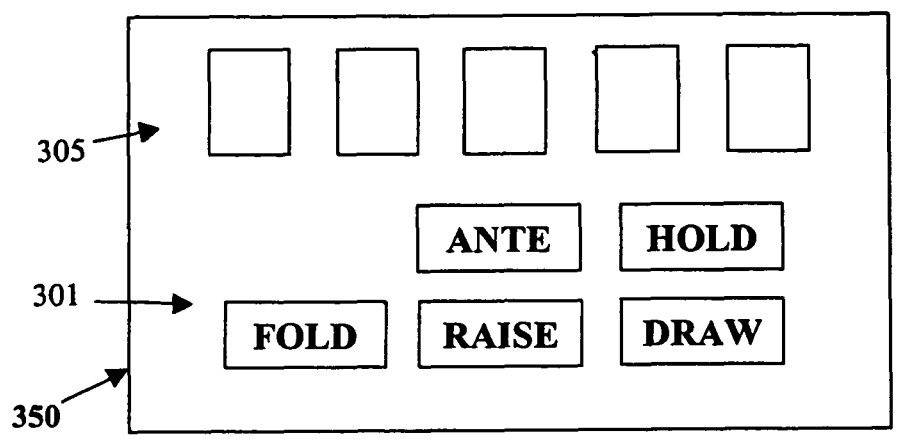
Figure 3C:
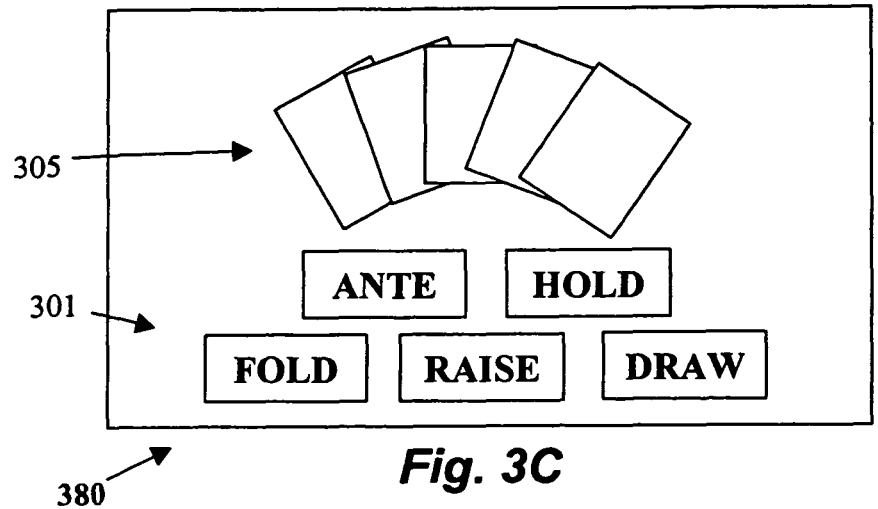

Displays 300, 350 and 380 of FIGS. 3A, 3B and 3C, respectively, provide additional examples of displays that may be used to implement some aspects of the invention. Such GUIs can make it difficult for a bot to participate in an online card game, while providing a convenient user interface for human players. Displays 300, 350 and 380 are examples of GUIs that may be used to implement various types of online poker games. It will be appreciated that other controls, more or fewer controls or cards, etc., may be used in GUIs that are within the scope and spirit of the invention. For example, alternative implementations provide blackjack GUIs, GUIs for other poker games, etc.

FIG. 3A, for example, includes control portion 301 with individual control buttons that a player may use to fold (button 310), ante (button 315), hold (button 320), raise (button 325) and/or draw (button 330). FIG. 3A depicts individual card images 307 in card portion 305. In some implementations of the invention, individual card images 307 can be changed independently from the rest of display 300. Accordingly, display 300 could be used to implement some aspects of the invention wherein an overall configuration of a GUI persists when some elements change: in this example, one or more cards of card portion 305 could be replaced, while maintaining the overall configuration of control portion 301. Such changes may occur when new cards are drawn, between hands, etc.

In alternative implementations of the invention, however, a new GUI may be downloaded, for example, each time a new hand (or even a new card) is provided to a player. In some such implementations of the invention, a GUI will be changed more frequently as a countermeasure in response to, e.g., a suspected bot. Such countermeasures will be described in more detail below.

Display 350 of FIG. 3B provides features similar to those of FIG. 3A, including the depiction of individual playing card images. However, control portion 301 and card portion 305 are presented in different parts of display 350, as compared to display 300. It will be appreciated that even if the same buttons are used in control portion 301 and the same number of playing cards are displayed, many alternative arrangements of controls and playing cards may be used in similar GUIs. Accordingly, some implementations of the invention provide GUIs that have few or no changes when there is no indication of bot use, but wherein the frequency and/or the magnitude of the change increases when bot play is suspected.

For example, display 380 of FIG. 3C provides a modification of display 350 that should not be overly disruptive to a player, yet should be significantly more challenging for a bot to interpret. The buttons in control portion 301 have been shifted. Card portion 305 is presented as a single hand of fanned-out cards. In some such implementations, the playing card images in card portion 305 may be individually replaced when a player draws cards, and in other implementations a new "hand of cards" image is downloaded and presented in card portion 305 when a player draws cards.

It will be appreciated that the examples of displays shown and described herein are merely illustrative of many ways in which displays may be presented and/or altered within the scope of the invention. For example, in some implementations of the invention, the format, shape and/or position of a card symbol and/or suit symbol, playing cards, controls of a GUI, etc., may change over time (e.g., from hand to hand). Other positions, shapes, etc., may be used for card symbols and suit symbols within the scope of the invention. Moreover, images of chips or the like may be used for wagering instead of numerical bets.

Some cheaters may use image/pattern recognition software in conjunction with a bot in attempts to work around some of the foregoing display methods. However, many cheaters will not be able to do this easily. Even relatively sophisticated cheaters would require a certain amount of time to implement the required image recognition software.

As increasingly effective image recognition software is deployed, other display methods, cheating detection methods, etc. can be implemented in response. Such methods may be applied across the board or as countermeasures to specific instances of suspected bot use.

Moreover, some pattern recognition software will be able to correctly interpret game information in displays (or other necessary game information, such as that provided by audio prompts) only part of the time. These inabilities will be characteristic of certain versions of pattern recognition software and can be tracked and recognized. Certain versions of bots and/or pattern recognition software may be identified and categorized according to such idiosyncrasies.

Such identification and categorization is one example of more generalized methods that may be applied to track, determine and analyze characteristics of players and bots. An overview of some such methods will now be described with reference to flow chart 400 of FIG. 4.

Figure 4:
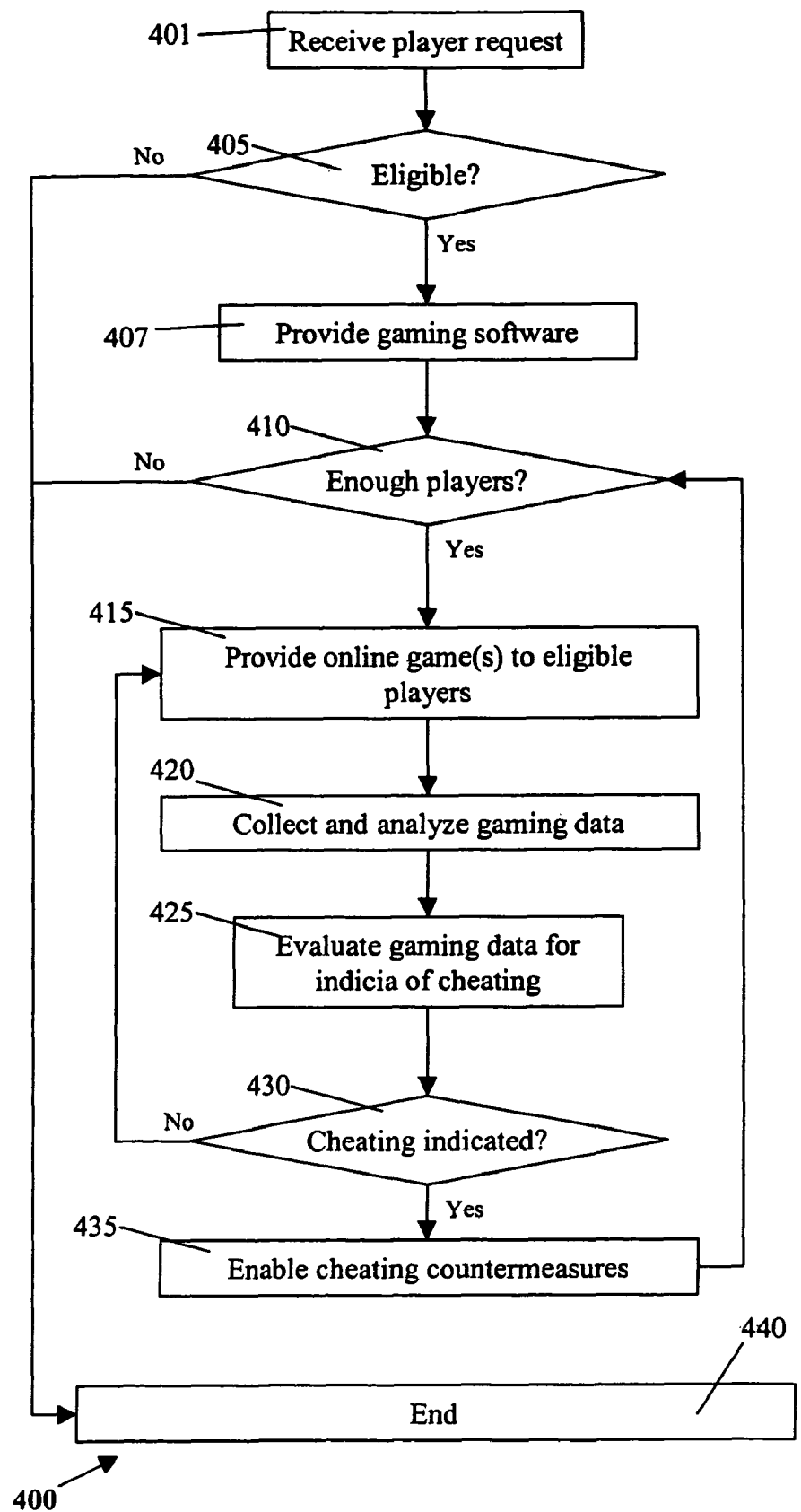
FIG. 4 is a flow chart that outlines some methods of the invention.

The methods shown and described herein, including but not limited to those outlined in FIG. 4, are not necessarily practiced in the sequence shown and described. Moreover, the methods shown and described herein may have more or fewer steps than are indicated herein. For example, it may be necessary to provide gaming software (step 407) only at certain times, e.g., initially, when there are updates, etc. However, players' eligibility should be determined (step 405) not only during an initial registration process, but also before each session of gaming.

In step 401, a request is received (e.g., by a device of game provider 105) from a player for online gaming. In step 405, it is determined whether a player is eligible to participate in the online gaming. If a wagering game is involved, the player's location will need to be one in which the type of wagering game is permitted. Moreover, the player's identity and age need to be determined, in order to ensure that the player is old enough to play wagering games.

The player's available credit, creditworthiness, etc., should also be evaluated. However, although the financial aspects of online gaming are multi-faceted and highly important, they are not the main thrust of this application and will not be elaborated upon herein. Known methods of addressing such needs may be applied when implementing the present invention.

Any type of personal identification methods and devices known in the art may be used to identify a player. Data used in an initial registration process are preferably stored for subsequent use. For example, the player may be asked to use biometric device such as retinal scanner, a fingerprint reader, etc., and to transmit the data obtained from the biometric device to a central location. The player may be asked to input a confirmation number, swipe a card, and/or use a special dongle having an encrypted password, a key, etc. The player may be asked to make an oral response during a telephone call to a telephone number associated with the player's location. The oral response may be analyzed, e.g., according to known voice biometrics of a user obtained during a registration process, to verify the user's identity. The user may also be prompted to make statements verifying his or her identity, age, a maximum amount available for wagering or other statements, which are preferably recorded and stored.

In some implementations, if the user's location is fixed, the location will be determined in part by reference to a database of land telephone lines, modems, etc., and corresponding addresses. The location may be verified by reference to a location determined by other methods, e.g., by use of a "traceroute" or similar program to determine the location of an Internet service provider's network device that is near a user's host device.

However, some players may use a mobile device, such as wireless device 180 of FIG. 1, for gaming. Accordingly, a user's location may change, even during the course of a gaming session. Therefore, in some implementations, a user's location is determined in other ways, e.g., by reference to positioning information provided by a cellular telephone network. For example, if the user is called on a cellular telephone to verify his or her identity, it may be presumed that the user's location could change during the gaming session. The location is preferably checked again during the gaming session (if one is established) in order to ensure that the player is still within a jurisdiction that allows online gaming.

The device or devices that a player uses for online gaming are preferably identified and logged. Some implementations of the invention apply device fingerprinting techniques for device identification and/or verification. Some such fingerprinting techniques involve the exploitation of small deviations in processor clock skews. Relevant techniques are discussed, for example, in Kohno, Tadayoshi, "Remote Physical Device Fingerprinting" (IEEE Symposium on Security and Privacy [May 2005]), which is hereby incorporated by reference for all purposes.

After a player's eligibility is determined, gaming software is provided (step 407), e.g., by downloading the software from a server of game provider 105 to a player's host device in an uncontrolled environment. In step 410, it is determined whether enough players are currently available to play a requested type of game. If there are sufficient players available, online games will be provided to eligible players.

In step 420, players' gaming data are collected and analyzed. Some implementations of the invention involve the tracking and analysis of gaming data that includes, but is not limited to, the following: response time, win frequency, win amount, time spent playing, game play decisions and wagering decisions. A player's responses and other gaming data are preferably tracked over a period of time.

For example, some implementations compare a player's game play decisions with a "perfect" game play strategy. A player's style of play may be determined and categorized, including but not limited to the percentage of the time a player makes optimal game play decisions, the length of typical gaming sessions, typical wagering amounts, etc. A normal variation in one or more such factors may be determined so that abnormal instances of game play can be determined.

Accordingly, some implementations of the invention involve calculating a player's characteristic percentage of optimal decision-making, a player's characteristic range of deviation from this characteristic percentage, a player's characteristic range of deviation from perfect game play, or similar values. For example, a player may tend to make optimal decisions 90% of the time, on average, but the player may have made optimal decisions during 95% of a particular gaming session, during only 87% of another gaming session, etc. A player's characteristic range of deviation may be, for example, a standard deviation, two standard deviations, etc. A player may tend, for example, to deviate gradually from perfect play as the player plays for an increasing length of time. If a player is suddenly playing at a level quite different from his or her historical range, this indicates that something is awry.

We would expect a bot's response time to be very consistent unless it has been programmed otherwise. Humans are not that consistent. We would expect a person's response time to vary within a predetermined range of an average response time. Therefore, another metric that can be logged, stored and evaluated is a player's response time. A player's response time should vary, but players may tend to be faster or slower than others. A player's average response time and characteristic range of deviation from the average response time may be determined.

Some methods of the invention involve skill level classification, which may involve player classification and/or bot classification. For example, games (including but not limited to poker games) may be organized by skill level. Players could be grouped with other players at a similar skill level. Players who play at a higher level and/or win more would not be able to prey on beginners.

The data collection and analysis may be performed by a single device or by multiple devices. Some implementations of the invention provide a multi-tier approach to data collection and/or analysis, wherein data gathering and/or collection tasks are distributed among multiple devices. Certain types of data may be collected and/or analyzed at a central location and other types of data may be collected and/or analyzed at a host device, such as a player's host device. As described in more detail below, some methods of the invention are performed, at least in part, by software installed on a player's host device (e.g., downloaded to a player's computer or the like).

In some implementations, game data are gathered by each host device during each gaming session. At the end of each session, these data are associated with a player and a host device, are time-stamped and are transmitted to a central storage device. Preferably, the data are compressed and hashed, for efficient data storage and to allow authentication. A copy is preferably retained on the host device (or an associated storage device).

In step 425, gaming data are evaluated for indicia of cheating. Many types of gaming data may be evaluated for indications of cheating within the scope of the invention. Preferably, data involving multiple variables are analyzed in order to increase the likelihood of correct determinations. For example, consistently perfect or nearly-perfect game play suggests that a player is actually a bot (or is using a bot or similar software). However, if the player also has a consistently small response time and can play for long time periods without making an error, the player is even more likely to be a bot.

One way to detect a bot by using a multi-variable analysis is to detect play that indicates a precise calculation of "pot odds" and related odds (such as implied odds and reverse implied odds) in a poker game. These odds which can be difficult for a human being to compute; it is very unlikely that a person could quickly and consistently determine such odds accurately.

Pot odds are a ratio of how much money is already in a pot compared to the amount of money a player would have to put in the pot in order to remain in a hand. For example, if the pot is currently $150 and a player must put in $15 to remain in the hand, the pot odds are 150 to 15 or 10 to 1.

Ideally, the pot odds should be compared to the odds of winning a hand, which involves a determination of "implied odds" and "reverse implied odds." "Implied odds" are the odds that take into account future bets. "Reverse implied odds" and "redraws" involve the chance that a player will achieve a desired hand after a draw, but will still lose the hand. If the player thinks that the odds of achieving what the player believes would be a winning hand are less than the pot odds (e.g., 1 in 5 in this example), the player should stay in the game.

Therefore, an accurate determination of pot odds involves both wagering data and play level data. Moreover, if a player's response time is consistent and small when complex pot odd calculations (or similar calculations) are required, the player is probably a bot (or using a bot).

An alternative indication of cheating could be indicated when an evaluation of a player's strategy indicates that the player is very consistently following a complex rule set, suggesting that a program/bot is actually making the decisions. Such methods are particularly effective in "corner cases" wherein the application of a simple rule set (one that a normal human might use) would indicate one response, but a more sophisticated mathematical analysis would indicate another response.

For example, if the player is dealt a pair of face cards and three cards to a royal flush, it is difficult to decide between going for the royal flush or just keeping the pair of face cards. Some players think the "safe" thing to do is hold the pair and draw three more cards for a chance at three of a kind, four of a kind or a full house. However, a mathematical analysis reveals that many poker games provide better long-term rewards for going for the royal flush. The actual corner cases that exist will vary from one type of game to the next, so that even if a player has memorized the best strategies for one type of game, he will unknowingly make some suboptimal choices in another very similar type of game. Therefore, some methods of the invention involve detecting such corner cases and determining whether a player is consistently making responses that only a computer program would be likely to make.

In step 430, it is determined whether indicia of cheating have been detected. This determination may be made by a central computing device, e.g., one associated with game provider 105, and/or by a device in another location, such as a player's host device. If no indicia of cheating have been detected, play may continue as before (step 415).

However, if an indicium of cheating has been detected, cheating countermeasures are invoked (step 435). The term "cheating countermeasures" (and the like) is used herein to mean not only measures taken when cheating is indicated, but also measures taken when cheating or another irregularity is suspected. The severity of the countermeasures should be commensurate not only with the degree and type of cheating indicated, but also with the degree of certainty associated with the indication(s). For example, if there are preliminary indications of bot use, a display may be used that is believed to be more difficult for bots to interpret, the display type may be changed more frequently, etc. On the other hand, if there is a very high probability that cheating has occurred and is ongoing, a player may be prevented from further play, assessed a monetary penalty, etc. Certain users and/or devices may be "blacklisted" and tracked. Information about blacklisted players and/or devices may be provided to other entities, possibly for a price.

The detection of a bot would not necessarily result only in some sort of penalty. For example, some implementations require bots to play in "bot rooms" wherein player's bots can compete against one another. For example, game provider 105 could assess a penalty against a person whose bot is caught competing against humans, but could actually facilitate bot-against-bot play. A game provider could even enable bot-against-bot tournaments. Some programmers have a great deal of pride in their work and may be very interested to determine how their bots would fare in such a tournament.

Some implementations of the invention require responses to audio and/or visual information in order to continue participating in a game. For example, a player may be required to respond correctly to a spoken question or command. A player may be prompted to perform an action to prove he or she is not a bot ("Wave at the camera," "Stick out your tongue," "Raise your right pinky," "Make a fist," etc.). The actions could be, e.g., recorded on a webcam and transmitted to a central location for evaluation. The prompt is preferably in a form that would be difficult for a bot to detect (audio, hashed writing, etc.).

In some implementations of the invention, such requirements are countermeasures that are invoked when cheating is suspected. In such implementations, these types of "challenge and response" measures will be used only when (or will be used more frequently when) indicia of cheating have been detected and/or when a player is determined to be playing abnormally.

For example, if a player is using another player's host device, the new player's play characteristics may be sufficiently different to allow detection. An appropriate countermeasure might be to query the player, require identification, etc., to determine whether it is the same player or is at least an authorized player. Accordingly, some methods of the invention can help to verify that an under-age player is not using an older player's ID, password and/or host device for online gaming.

In some alternative implementations, such requirements are implemented whether or not cheating is suspected. New actions may be required on a regular basis. A player could be required to leave a webcam on continuously during play, with the understanding that the player could be randomly monitored at any time. However, such requirements may not be popular with players.

Some required responses could be built into game play, to avoid distracting a player or breaking a player's concentration. For example, instructions about game play could be given orally or in another form that would be difficult for a bot to interpret (e.g., "You are not allowed to raise at this point"). A human player would be able to respond appropriately, but a bot would probably not respond appropriately. In some implementations, the accent used for voice instructions is changed from time to time, because such changes are very challenging for voice recognition software.

Having an audio link between players could also help to root out bots. In some instances of game play, players will speak with various types of accents and possibly in various languages. If a player never speaks or never responds appropriately, the player is likely to be a bot. Players would have a vested interest in making sure they are playing against other humans. Players could report suspicious responses to a central game administrator. The administrator could provide various types of countermeasures, including any of the above detection/authentication methods, watching for other indications of a bot, etc. The administrator could send a message to other players, such as "BOT DETECTED" or the like. Such a notice would give other players a chance to leave the game. The administrator could terminate a cheater's activity.

Some cheating detection methods are more resource-intensive than others. Given the high volume of activity and the large number of players involved in online gaming, selective application of cheating detection methods may be desirable. Therefore, some implementations of the invention involve multi-tiered detection methods, wherein one level of data analysis may trigger another level of data analysis. In some such implementations, the analyses may be distributed over multiple devices.

Some such data collection and analyses may be more resource-intensive and may, therefore, be performed (at least in part) by devices other than a centralized computing device. For example, data gathering and/or analysis may be performed by software running on the host devices used by players, e.g., for Internet wagering games. The software may be provided, e.g., along with the software necessary for participating in Internet wagering games. Preferably, such software will need to be authenticated prior to or during each gaming session by a digital signature, a "heartbeat," etc.

Figure 5:
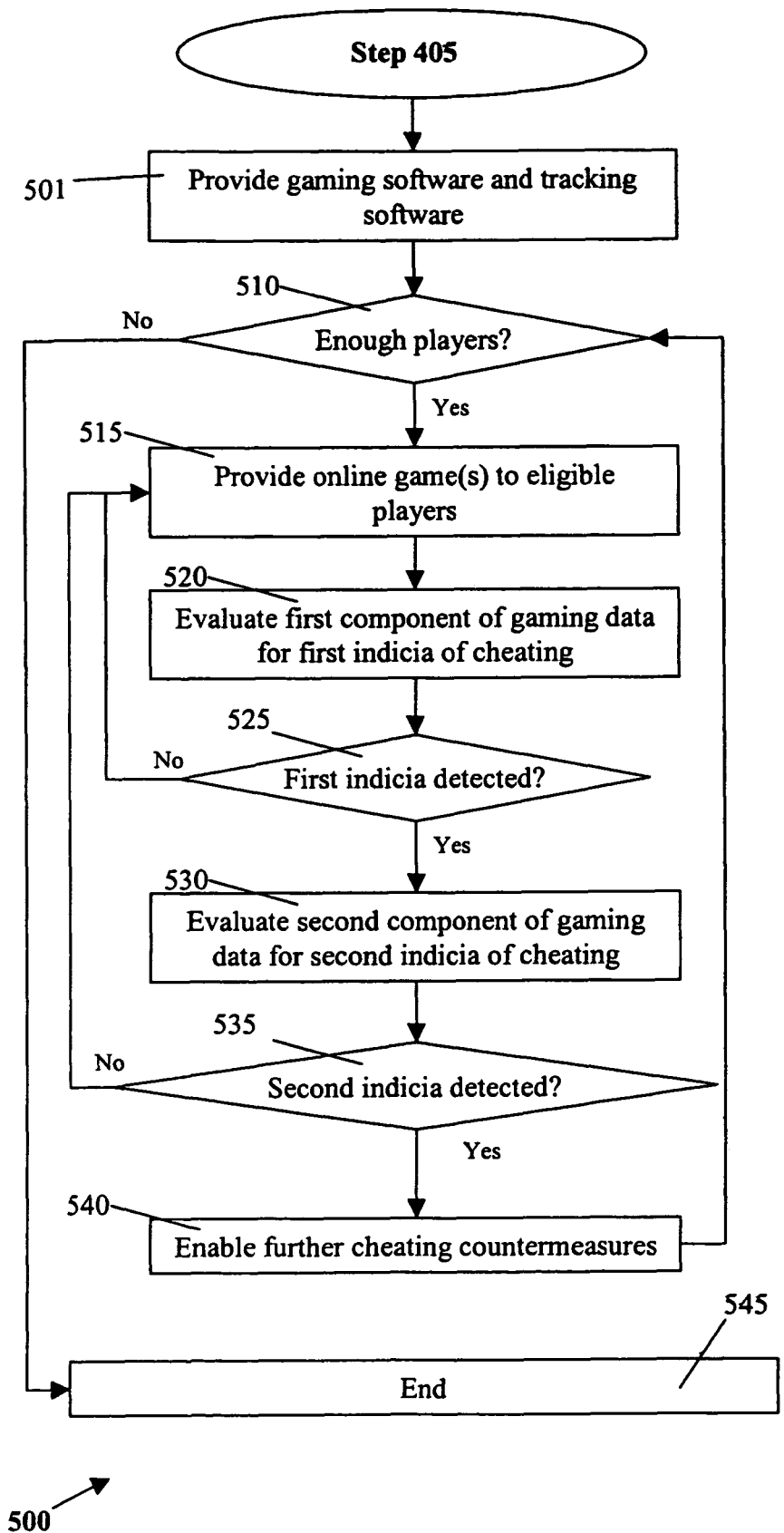
FIG. 5 is a flow chart that outlines other methods of the invention.

Some such methods of the invention will now be described with reference to FIGS. 5 and 6. Referring first to FIG. 5, method 500 begins after a player's request for gaming has been received and it has been determined that the player is eligible to play (in steps 401 and 405 or the like). In step 501, tracking software is provided along with gaming software. As used herein, the term "tracking software" and the like means software that can at least track player gaming data, but which may also be able to perform analysis and other higher-level functions.

The tracking software is preferably used at a high user permission level. This is because an application running at a low level cannot detect an application running at a higher level. However, an application running at a higher level can detect an application running at a lower level. Therefore, tracking software running at a higher level should be able to detect remote control software from a second PC running a "bot" program.

Some implementations of the invention require authentication of tracking software. For example, a server could check for the proper digital signature of tracking software. Some implementations involve a heartbeat (or the like) emitted by the tracking software and verified by a central system (and/or vice versa) as a condition for continued play. Such implementations may have the "heartbeat" be irregular, change over time, change each time a session is initiated and/or when other predetermined events occur, etc., to make it harder to spoof.

If it is determined that enough players are available (step 510), online games are provided to eligible players (step 515). In step 520, a first component of gaming data will be evaluated for first indicia of cheating. For example, some such implementations analyze financial indicia (e.g., win frequency and/or amounts) to determine whether such indicia exceed predetermined thresholds.

If first indicia of cheating are determined to exceed predetermined thresholds (step 525), other types of analyses may be initiated or reported. In this example, first indicia of cheating are determined in step 525 and therefore a second component of gaming data is evaluated for second indicia of cheating. (Step 535.) For example, a determination of greater-than-expected win frequency and/or win amounts in step 525 may trigger a more detailed investigation of a player's response times, time spent playing, game play and wagering decisions, etc. (Step 530.) If second indicia of cheating are also determined (step 535), further cheating countermeasures are invoked (step 540). The term "further" is used here because subsequent levels of analysis can be considered one type of "countermeasure" as the term is used herein.

Some such implementations of the invention involve a two-tiered detection method, wherein "light" statistics are tracked by a server or other central computing device (e.g., how much money players are making, how often they win, how long they are playing, etc.) and "heavy" statistics (e.g., percentage of the time that are players making the best choice, response time, response time variation, etc.) are tracked by software running on a player's PC or other host device. Statistics on the server are much harder to fake.

Figure 6:
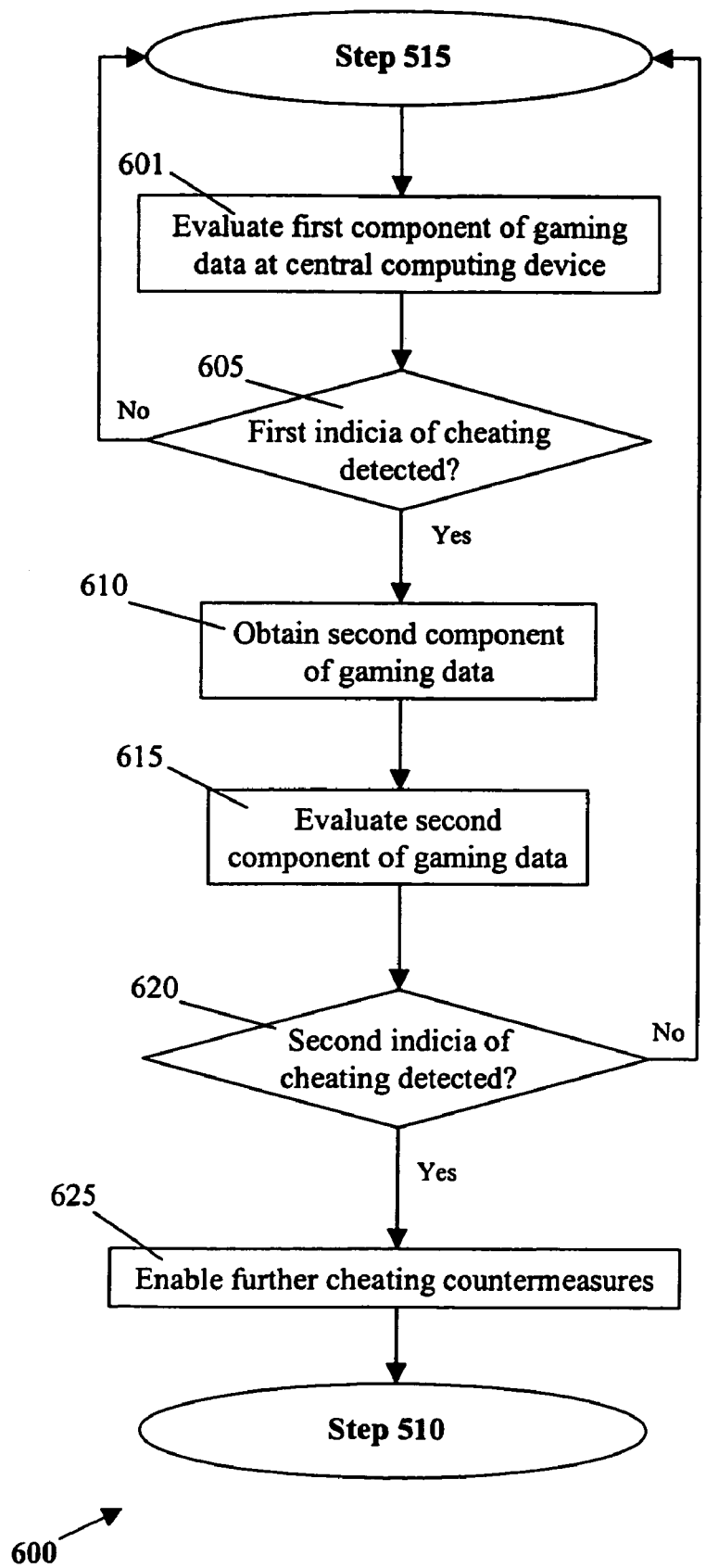
FIG. 6 is a flow chart that outlines yet other methods of the invention.

FIG. 6 outlines an instance of method 500 wherein the first component of gaming data is analyzed by a centralized computing device such as a server, by a host device associated with a gaming server, etc. (Step 601.) Here, data tracked by a server or another such central computing device are used as threshold indicators for further investigation. When first indicia of cheating are detected (step 605), a second component of gaming data is obtained (step 610) and evaluated (step 615).

In some such implementations, an administrator and/or a centralized computing device will query another device in step 610 (e.g., a host device or a storage device) for data and/or analytical results. For example, tracking software running on host devices may regularly collect relevant data and may perform certain types of analyses only in response to a prompt from a centralized computing device, an administrator, etc. Alternatively, the host device may perform relevant analyses on a routine basis but will report results to centralized computing device, an administrator, etc., only in response to queries and/or only when an analysis indicates that some form of cheating may be indicated: preferably, certain indicia of cheating (such as perfect game play) will be automatically reported by a host device.

If second indicia of cheating are detected (step 620), further cheating countermeasures may be invoked. (Step 625.) If one or more players is no longer able to play, it is possible that a particular game will need to be suspended until more players are available. Therefore, the process returns to step 510 to determine whether enough eligible players still desire to play the game.

However, if a player is cheating but still losing money, no action will be taken according to some implementations of the invention. Alternatively, cheaters who are winning or losing approximately the same amount as the average player may not immediately be prevented from playing, but instead may be flagged as cheaters, monitored and allowed to continue playing. These cheaters may be subjected to more rigorous scrutiny than average players, because their cheating methods are likely to improve if they continue playing.

Moreover, the cheating of one player may involve intentionally helping another player. Some implementations of the invention involve detection and prevention of unfair collaboration between players, which will sometimes be referred to herein as "collusion" or the like. Just as a bot can be detected by perfect game play, collusion could be inferred by times of lapses/worse-than-normal game play that consistently benefit another player or players. By flagging instances in which a player's style of play gets worse and determining what other players are benefiting during those times, it may be possible to detect collusion between players.

For instance, when one player has a strong hand and his "partner" has a weak hand, the partner could take actions to drive the betting up, so that the partner could collect. The partner may be playing very well at other times, yet making blatant "mistakes" (e.g., in terms of wagering) when the partner has a strong hand. If the mistakes seem to defy the logic of a rational player and consistently benefit another player or players, there is probably collusion.

Because most forms of collusion will not appear to benefit all players involved, detecting collaboration may require analyses of more than one player's gaming history. For example, in some implementations of the invention, when one player is observed to be winning more than a threshold amount and/or more often than a threshold win frequency, not only that player but other players involved in the games will be investigated. Various indicia that suggest collusion may be investigated, including but not limited to (1) the consistent involvement of certain players during times that a player is winning; (2) more than one player being in the same location during times that the player is winning; and (3) abnormally bad decisions on the part of other players that consistently coincide with times that the player is winning.

Figure 7:
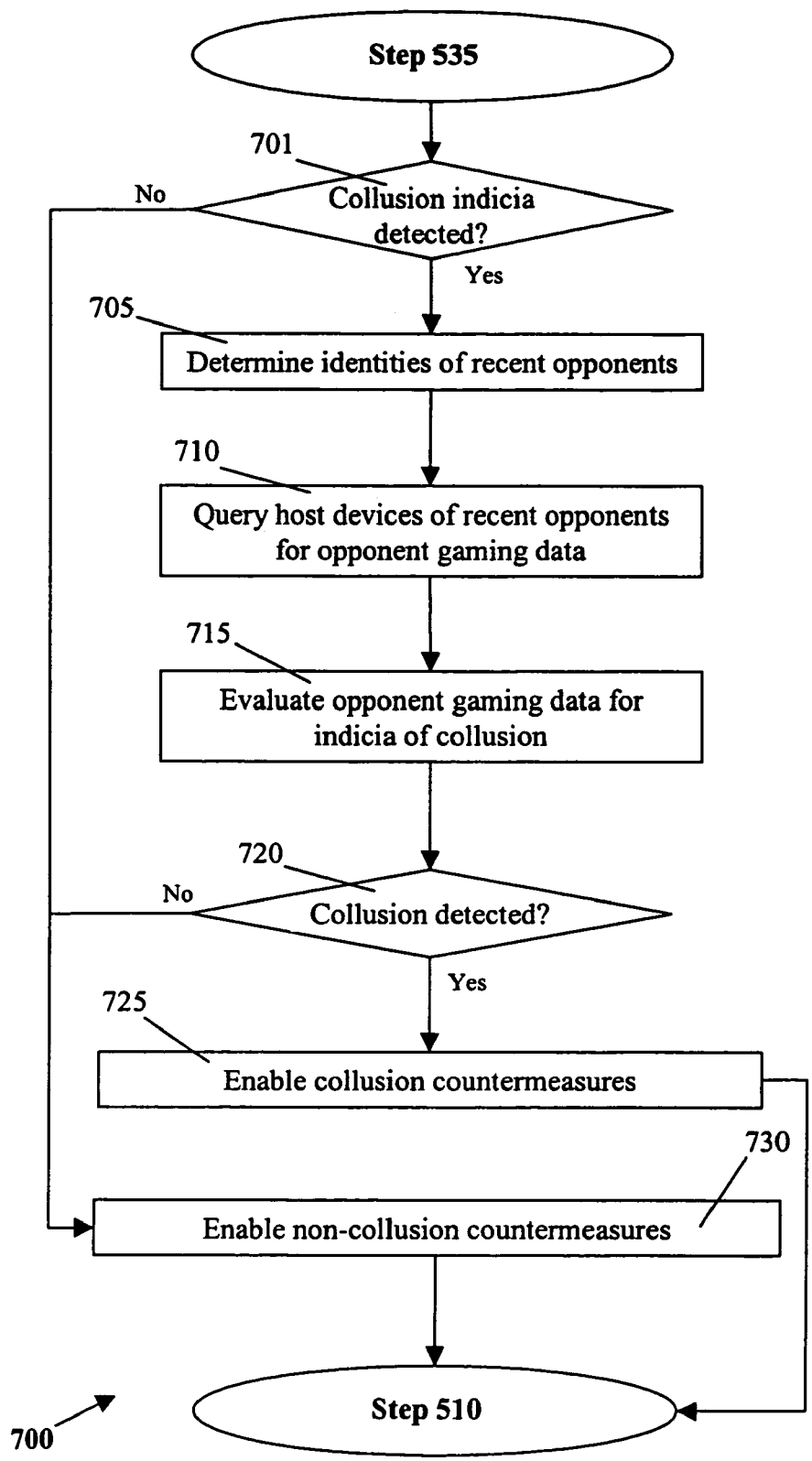
FIG. 7 is a flow chart that outlines alternative methods of the invention.

One collusion detection method is outlined by flow chart 700 of FIG. 7. In this example, both first and second indicia of cheating have previously been detected, so the method begins with step 535 of FIG. 5. However, various other scenarios could trigger an investigation of collusion. One such example was described above, wherein a player appeared to be cheating but was nonetheless losing money. Such players could be flagged and used in a collusion analysis.

Next, the identities of a suspected colluder's recent opponents are determined (step 705). Players who have repeatedly been the suspected colluder's opponents are particularly suspect. Opponent gaming data are then obtained. (Step 710.) In this example, opponent gaming data are obtained by querying the opponents' host devices, but the opponent gaming data may be obtained in other ways, e.g., by querying a storage device of a game provider wherein such data are routinely stored.

Opponent gaming data are then evaluated, in conjunction with gaming data of the suspected colluder, for indicia of collusion. (Step 715.) In this example, it is determined whether more than one of the players has been in the same location during times that the player is winning. It is also determined whether abnormally bad decisions on the part of other players consistently coincide with times that another player is winning.

If collusion is detected, collusion countermeasures are invoked. (Step 725.) These countermeasures may be substantially the same as some described above, except that players with apparent losses may also be penalized. Moreover, a further investigation into the identities of other possible colluders may be triggered. For example, recent opponents of all of the suspected colluder's opponents may be identified, game data regarding these players may be obtained and analyzed, etc. If no collusion is detected, non-collusion countermeasures are invoked in this example, because first and second indicia of cheating had already been determined. Non-collusion countermeasures may include reassigning players to different games.

However, it is apparent that players don't have to be in the same location to be colluding with each other. Methods such as phone calls, instant messages, or even e-mail could also used effectively. Conversely, players in the same location are not necessarily colluding. Therefore, location alone is unlikely to be an accurate indicium of collusion.

Figure 8:
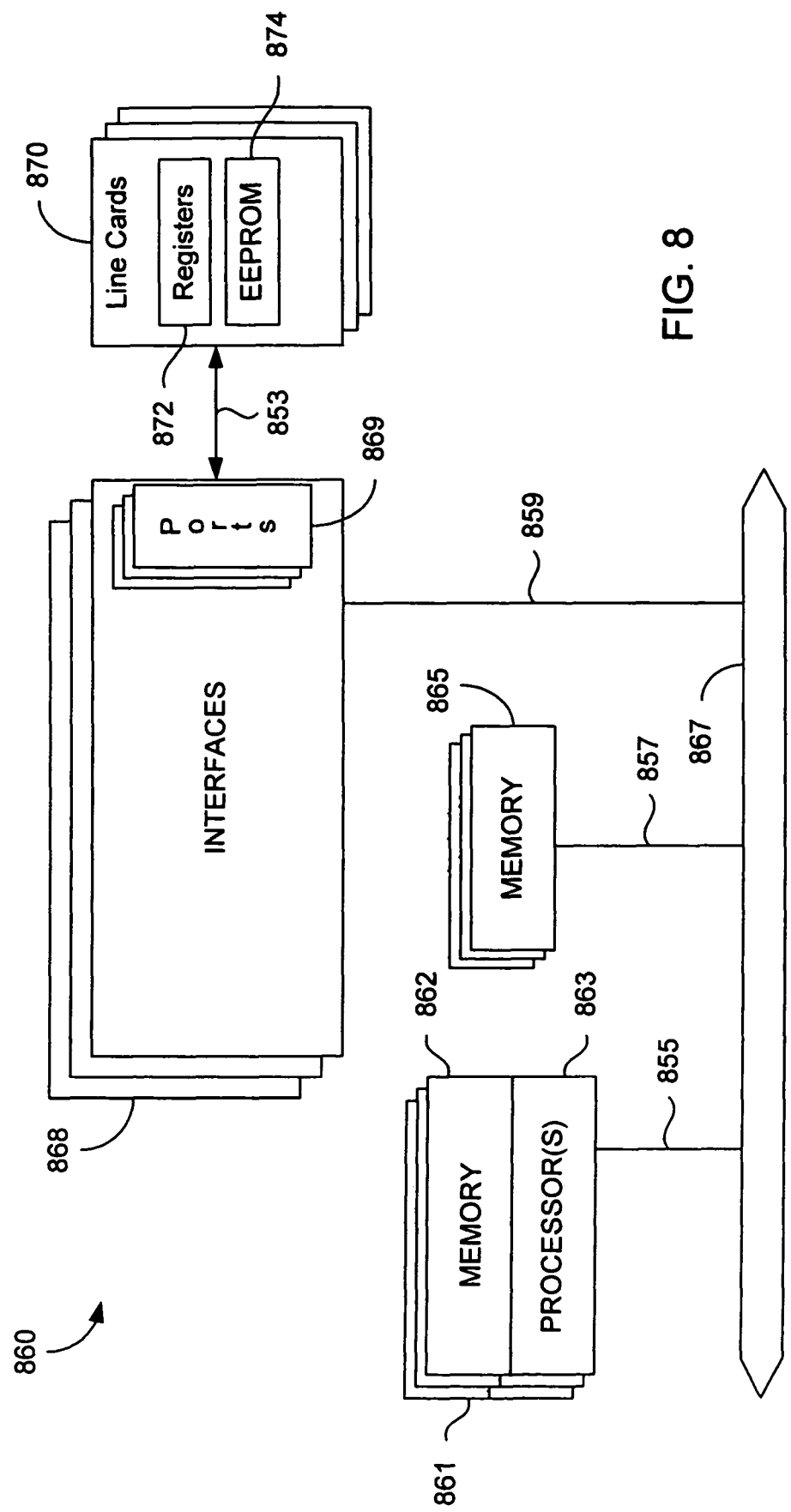
FIG. 8 illustrates a network device that may be configured according to some aspects of the invention.

FIG. 8 illustrates an example of a network device that may be configured for implementing some methods of the present invention. Network device 860 includes a master central processing unit (CPU) 862, interfaces 868, and a bus 867 (e.g., a PCI bus). Generally, interfaces 868 include ports 869 appropriate for communication with the appropriate media. In some embodiments, one or more of interfaces 868 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 868 control such communications-intensive tasks as encryption, decryption, compression, decompression, packetization, media control and management. By providing separate processors for the communications-intensive tasks, interfaces 868 allow the master microprocessor 862 efficiently to perform other functions such as routing computations, network diagnostics, security functions, etc.

The interfaces 868 are typically provided as interface cards (sometimes referred to as "linecards"). Generally, interfaces 868 control the sending and receiving of data packets over the network and sometimes support other peripherals used with the network device 860. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 862 may be responsible for implementing specific functions associated with the functions of a desired network device. According to some embodiments, CPU 862 accomplishes all these functions under the control of software including an operating system and any appropriate applications software.

CPU 862 may include one or more processors 863 such as a processor from the Motorola family of microprocessors or the MIPS family of microprocessors. In an alternative embodiment, processor 863 is specially designed hardware for controlling the operations of network device 860. In a specific embodiment, a memory 861 (such as non-volatile RAM and/or ROM) also forms part of CPU 862. However, there are many different ways in which memory could be coupled to the system. Memory block 861 may be used for a variety of purposes such as, for example, caching and/or storing data, programming instructions, etc.

Regardless of the network device's configuration, it may employ one or more memories or memory modules (such as, for example, memory block 865) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 8 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 8) or switch fabric based (such as a cross-bar).

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the present embodiments are to be considered as illustrative and not restrictive, and the invention is not to be limited to the details given herein, but may be modified within the scope and equivalents of the appended claims.

We claim:

1. A gaming method, comprising:
 gathering gaming data on one or more host devices while software for providing an online poker game is executing on the one or more host devices;
 evaluating a first component of the gaming data to detect first indicia of cheating, the first component of the gaming data comprising financial data;
 invoking a response when the first indicia of cheating is detected, the response including querying, by a central computing device, at least one of the one or more host devices for a second component of the gaming data gathered by at least one host device of the one or more host devices;

analyzing the second component of the gaming data to detect second indicia of cheating, the second component of the gaming data comprising statistical data indicating one or more deviations in the characteristic game play of a player; and invoking cheating countermeasures when the second indicia of cheating or both the first indicia and the second indicia of cheating are detected.

2. The gaming method of claim 1, wherein the first indicia of cheating include win frequency indicia or win amount indicia.

3. The gaming method of claim 1, wherein the evaluating step is performed by the central computing device.

4. The gaming method of claim 1, wherein the second indicia of cheating indicate the use of a bot to control, at least in part, game play decisions.

5. The gaming method of claim 1, wherein the second indicia of cheating include at least one of play consistency indicia, reaction time indicia, and optimal play indicia.

6. A gaming method, comprising:

gathering gaming data on a first plurality of host devices while software for providing an online poker game is executing on each of the first plurality of host devices;

evaluating a first component of the gaming data on a central computing device to detect first indicia of cheating, the first component of the gaming data comprising financial data;

invoking a response when the first indicia of cheating is detected, the response including querying, by a central computing device, at least one of the first plurality host devices for a second component of the gaming data gathered by at least one host device of the first plurality of host devices;

analyzing the second component of the gaming data to detect second indicia of cheating, the second component of the gaming data comprising statistical data indicating one or more deviations in the characteristic game play of a player; and invoking cheating countermeasures when the second indicia of cheating or both the first indicia and the second indicia of cheating are detected.

7. The gaming method of claim 6, wherein the analyzing step is performed by one of the host devices in response to a signal from the central computing device to the host device, the signal being sent by the central computing device in response to detecting the first indicia of cheating.

8. The gaming method of claim 6, wherein the second indicia of cheating include at least one of play consistency indicia, reaction time indicia, collusion indicia, and optimal play indicia.

9. The gaming method of claim 6, further comprising the step of transmitting a signal from the central computing device to a second plurality of host devices in response to detecting the first indicia of cheating, wherein the response includes querying, by the central computing device, at least one of the first plurality host devices and at least one of the second plurality of host devices for a second component of the gaming data gathered by at least one host device of the first plurality of host devices and the second plurality of host devices and the analyzing step further comprises evaluating collusion indicia derived from the second component and is performed, at least in part, by the central computing device.

10. The gaming method of claim 6, wherein a bot is detected according to at least one of the first indicia of cheating and the second indicia of cheating and wherein the cheating countermeasures comprise preventing the bot from participating in games involving human participants.

11. The gaming method of claim 9, wherein the analyzing step is performed, at least in part, by the second plurality of host devices.

12. The gaming method of claim 11, wherein the analyzing step comprises determining lapse times during which a player's game play is worse than the player's normal level of game play.

13. The gaming method of claim 11, wherein the second plurality of host devices transmits information including results of the analysis performed by the second plurality of host devices to the central computing device.

14. The gaming method of claim 12, wherein the analyzing step further comprises determining whether one or more other players consistently win during a player's lapse times.

15. A gaming network, comprising:

means for providing online poker games;

means for gathering gaming data on one or more host devices while software for providing an online poker game is executing on the one or more host devices;

means for evaluating a first component of the gaming data to detect first indicia of cheating, the first component of the gaming data comprising financial data;

means for invoking a response when the first indicia of cheating is detected, the response including querying, by a central computing device, at least one of the one or more host devices for a second component of the gaming data gathered by at least one host device of the one or more host devices;

means for analyzing the second component of the gaming data to detect the second indicia of cheating, the second component of the gaming data comprising statistical data indicating one or more deviations in the characteristic game play of a player; and means for invoking cheating countermeasures when the second indicia of cheating or both the first indicia and the second indicia of cheating are detected.

16. The gaming network of claim 15, wherein the first indicia of cheating comprise win frequency indicia or win amount indicia.

17. The gaming network of claim 15, wherein the evaluating means comprises the central computing device.

18. The gaming network of claim 15, wherein the second indicia of cheating include at least one of play consistency indicia, reaction time indicia, and optimal play indicia.

19. A gaming network, comprising:

means for gathering gaming data on a first plurality of host devices while software for providing an online poker game is executing on the plurality of host devices;

means for evaluating a first component of the gaming data on a central computing device to detect first indicia of cheating, the first component of the gaming data comprising financial data;

means for invoking a response when the first indicia of cheating is detected, the response including querying, by a central computing device, at least one of the first plurality host devices for a second component of the gaming data gathered by at least one host device of the first plurality of host devices;

means for analyzing the second component of the gaming data to detect second indicia of cheating, the second component of the gaming data comprising statistical data indicating one or more deviations in the characteristic game play of a player; and means for invoking cheating countermeasures when the second indicia of cheating or both the first indicia and the second indicia of cheating are detected.

20. The gaming network of claim 19, wherein the analyzing step comprises one of the host devices acting in response to a signal from the central computing device, the signal being sent by the central computing device in response to detecting the first indicia of cheating.

21. The gaming network of claim 19, wherein the second indicia of cheating include at least one of play consistency indicia, reaction time indicia, collusion indicia, and optimal play indicia.

22. Computer-executable instructions stored on a computer-readable medium, the computer-executable instructions including instructions for controlling one or more devices in a network to:

gather gaming data on one or more host devices while software for providing an online poker game is executing on the one or more host devices;

evaluate a first component of the gaming data to detect first indicia of cheating, the first component of the gaming data comprising financial data;

invoke a response when the first indicia of cheating is detected, the response including querying, by a central computing device, at least one of the one or more host devices for a second component of the gaming data gathered by at least one host device of the one or more host devices;

analyze the second component of the gaming data to detect second indicia of cheating, the second component of the gaming data comprising statistical data indicating one or more deviations in the characteristic game play of a player; and invoke cheating countermeasures when the second indicia of cheating or both the first indicia and the second indicia of cheating are detected.

23. The software of claim 22, wherein the first indicia of cheating include win frequency indicia or win amount indicia.

24. The software of claim 22, wherein the evaluating step is performed by the central computing device.

25. The software of claim 22, wherein the second indicia of cheating include at least one of play consistency indicia, reaction time indicia, and optimal play indicia.

\* \* \* \* \*